United States Patent
Woehrl

(10) Patent No.: US 7,036,990 B2
(45) Date of Patent: May 2, 2006

(54) ROTARY BEARING ASSEMBLY HAVING A PRESET BREAKING POINT

(75) Inventor: Bernhard Woehrl, Gauting (DE)

(73) Assignee: MTU Aero Engines GmbH, Munich (DE)

( * ) Notice: Subject to any disclaimer, the term of this patent is extended or adjusted under 35 U.S.C. 154(b) by 92 days.

(21) Appl. No.: 10/351,872

(22) Filed: Jan. 27, 2003

(65) Prior Publication Data

US 2003/0142894 A1 Jul. 31, 2003

(30) Foreign Application Priority Data

Jan. 26, 2002 (DE) ................................. 102 02 977

(51) Int. Cl.
*F16C 19/52* (2006.01)

(52) U.S. Cl. ...................................... 384/548; 384/624

(58) Field of Classification Search ................ 384/548, 384/490, 624, 903, 584, 585
See application file for complete search history.

(56) References Cited

U.S. PATENT DOCUMENTS

| 4,289,360 A | 9/1981 | Zirin |
| 4,668,105 A | 5/1987 | Furukawa et al. |
| 6,009,701 A | 1/2000 | Freeman et al. |
| 6,331,078 B1 | 12/2001 | Van Duyn |

FOREIGN PATENT DOCUMENTS

EP 1 013 896 6/2000

*Primary Examiner*—Lenard A. Footland
(74) *Attorney, Agent, or Firm*—Kenyon & Kenyon LLP

(57) ABSTRACT

A rotary bearing assembly having a preset breaking point, particularly for a rotor of a turbo engine, includes a rotary bearing arranged between a nonrotating bearing carrier housing and a bearing carrier rotating about a rotational axis, the rotary bearing being fixed radially and axially at its outer bearing ring via a first tangential plane and a second tangential plane in the nonrotating bearing carrier housing. At predetermined stress, a breaking arrangement for the formation of a preset breaking point is provided, which is arranged in the first tangential plane and the second tangential plane, concentric with the rotational axis, between the outer bearing ring and the nonrotating bearing carrier housing.

19 Claims, 3 Drawing Sheets

ROTARY BEARING ASSEMBLY HAVING A PRESET BREAKING POINT

CROSS-REFERENCE TO RELATED APPLICATIONS

The present application claims priority to Application No. 102 02 977.6, filed in the Federal Republic of Germany on Jan. 26, 2002, which is expressly incorporated herein in its entirety by reference thereto.

FIELD OF THE INVENTION

The present invention relates to a rotary bearing assembly having a preset breaking point.

BACKGROUND INFORMATION

As is conventional, a rotor of a turbo engine, for instance, the rotor of a jet engine of an airplane, has several antifriction bearings for its rotary bearing assembly. These bearings support the rotating rotor on the static part, such as the housing, in the radial and axial direction, and in so doing, introduce the support forces acting on the bearing assembly into the housing.

In this context, it is a disadvantage that unforeseen high bearing stresses acting on the bearing assembly are also introduced into the housing, which, in the least favorable case, is able to destroy the housing. Thus, for example, in jet engines of an airplane, bird impact or blade resonance may lead to so-called blade fracture at the rotor. The running of the broken-off blade pieces through the subsequent blades of the rotor, and the dynamic behavior changed thereby, have the effect of a drastic increase in the bearing support forces introduced via the housing, for instance, into the jet engine suspension. This can lead to the destruction of the housing, the power plant suspension, or even to damage of the airframe.

It is an object of the present invention to provide a rotary bearing assembly having a preset breaking point so that, because of a new arrangement of the rotary bearing assembly having a preset breaking point, a remedy is created so that upon the appearance of unforeseen, high bearing stresses, damage to, or destruction of the housing may be avoided.

SUMMARY

The above and other beneficial objects of the present invention are achieved by providing a rotary bearing assembly as described herein.

According to the present invention, the preset breaking point, that breaks at a predetermined stress and is arranged concentrically with the axis, is provided in each case in the first tangential plane and in the second tangential plane between the bearing carrier housing on the one hand and the outer ring bearing of the rotary bearing on the other hand.

In this context, the first and second tangential planes are in particular aligned parallel to each other and, above all, perpendicular to the axis of rotation.

The preset breaking point positioned concentrically with the rotor in the first and second tangential plane is formed, according to the present invention, from a first groove introduced into the nonrotating bearing carrier housing, a second groove introduced into the outer bearing ring and arranged opposite in the axial direction and a preset breaking ring introduced into the two grooves lying opposite to each other.

In this context, it is provided that the preset breaking point is implemented, which leads to the fracture of the preset breaking rings at unforeseen, high bearing stresses. Because of the fracture of the preset breaking rings, the frictional connection between the outer bearing ring and the nonrotating bearing carrier housing is interrupted. This, in turn, has the result that the introduction of these extreme bearing stresses into the bearing carrier housing may be prevented. Destruction or further-reaching damage of the housing may thereby be prevented.

In order to define the breaking force of the preset breaking rings more precisely, the preset breaking rings may have a ring or annular groove.

The present invention is described below in the light of an exemplary embodiment that is represented schematically in the Figures.

DETAILED DESCRIPTION

Figure 1:
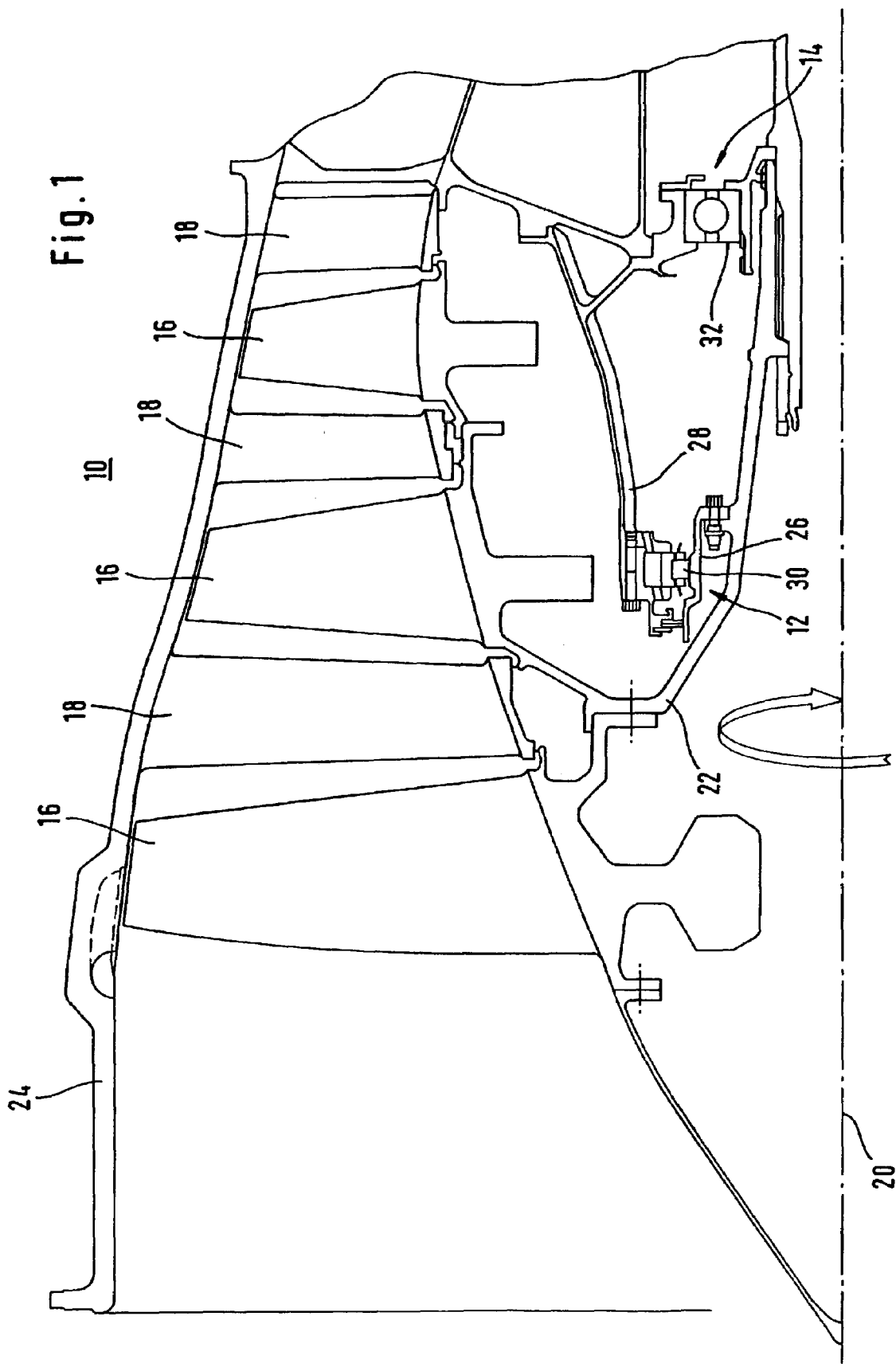
FIG. 1 is a cross-sectional view of a first stage of a jet engine, using the rotary bearing assembly, designed according to the present invention, having a preset breaking point.

A first stage of a jet engine marked as a whole by reference numeral 10 in FIG. 1 has a forward rotary bearing assembly 12 having a preset breaking point and a rear rotary bearing assembly 14.

The first stage of jet engine 10 includes several rotor blades 16 and-stator blades 18. In this context, rotor blades 16 are connected detachably to a rotor 22 rotating about an axis of rotation 20, and stator blades 18 are connected to a surrounding housing 24.

Forward rotary bearing assembly 12 has a rotary bearing 30 between a bearing carrier 26 that is detachably connected to a rotating rotor 22 and a nonrotating bearing carrier housing 28 connected to surrounding housing 24. In this context, nonrotating bearing carrier housing 28 has a housing inside diameter 31. In the present exemplary embodiment, rotary bearing assembly 30 of forward rotary bearing assembly 12 is an antifriction bearing of the kind made with rollers.

In rear rotary bearing assembly 14, rotary bearing 32 has an antifriction bearing made with balls.

Figure 2:
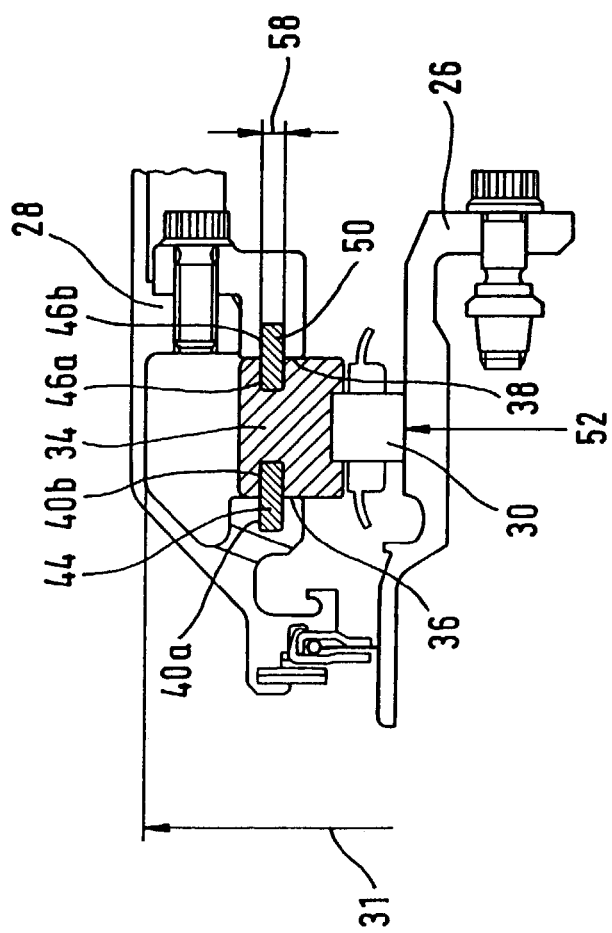
FIG. 2 is an enlarged representation of the forward rotary bearing assembly including the preset breaking point illustrated in FIG. 1.

As illustrated in FIG. 2, rotary bearing 30 is furnished with an outer bearing ring 34 which is axially and radially firmly connected to bearing carrier housing 28 via a first tangential plane 36 and a second tangential plane 38. The first and the second tangential planes 36 and 38 are aligned perpendicularly to rotational axis 20.

For the radial fixing of outer bearing ring 34 via first tangential plane 36 to bearing carrier housing 28, a first groove 40a is put into bearing carrier housing 28 concentric with rotational axis 20. A second groove 40b, which is opposite the first groove, is introduced into bearing ring 34, concentric with rotational axis 20. A first preset breaking ring 44 is introduced into the two grooves 40a and 40b.

The fixing beyond second tangential plane 38 is constructed identically to that in first tangential plane 36. A first groove 46a is introduced into bearing carrier housing 28, and a second groove 46b is introduced into outer bearing ring 34. A second preset breaking ring 50 is applied in second cavity 48 formed by the two grooves 46a and 46b.

The edges of grooves 40a and 40b as well as 46a and 46b arranged in tangential planes 36 and 38 are, in this connection, each made to have sharp edges.

The flow of force of a radial load 52 introduced by rotor 22 via bearing carrier 26 into the rotary bearing takes place via preset breaking rings 44 and 50 into bearing carrier housing 28.

If an excessive radial load 52 is present, caused, for example, by blade fracture, this leads to a fracture, or rather a shearing off, of preset breaking rings 44 and 50.

Figure 3:
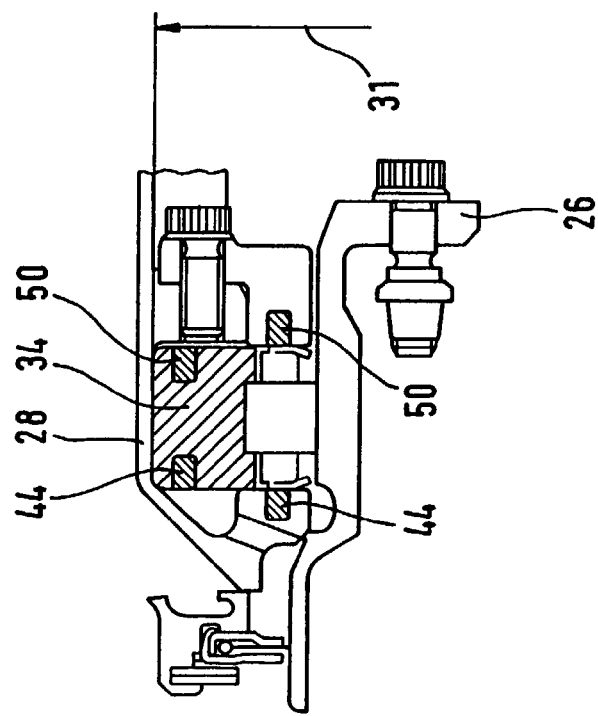
FIG. 3 illustrates the preset breaking point illustrated in FIG. 2 after the fracture of preset breaking rings.

As illustrated in FIG. 3, after the fracture of preset breaking rings 44 and 50 a radial shifting of bearing carrier 26 takes place and of rotary bearing 30 with its outer bearing ring 34, corresponding to the direction of force of radial load 52.

Housing inside diameter 31 is, in this situation, dimensioned so that rotary bearing 30 still has a certain supporting effect for bearing carrier 26, and thus (also) rotor 22, in order to prevent an uncontrolled sliding friction between rotating and nonrotating parts. The decay of the remaining rotational energy of rotor 22 tumbling in housing 24 takes place by the "controlled" destruction of rotor and stator blade 16 and 18.

In order to prevent further-reaching destruction, after the fracture of preset breaking rings 44, 50, an immediate interruption may occur in the fuel supply of the jet engine. For the purpose of detecting the fracture of preset breaking rings 44, 50, sensors may be provided at tangential planes 36, 38, which cooperate with a control device and/or regulating device which immediately interrupts the fuel supply of the jet engine after the fracture of preset breaking rings 44, 50.

The preset breaking rings span a ring thickness d. In each case in the axial direction, the depth in outer bearing ring 34 of opposing grooves 40a, 40b and 46a, 46b amounts to double to tenfold the ring thickness d.

In the present exemplary embodiment, preset breaking rings 44, 50 are produced from a brittle-fracturing material, e.g., an inelastic ceramic material. As an alternative, the preset breaking rings may also be made of a hardened spring steel or other materials having narrow-range fracture characteristics.

Figure 4:
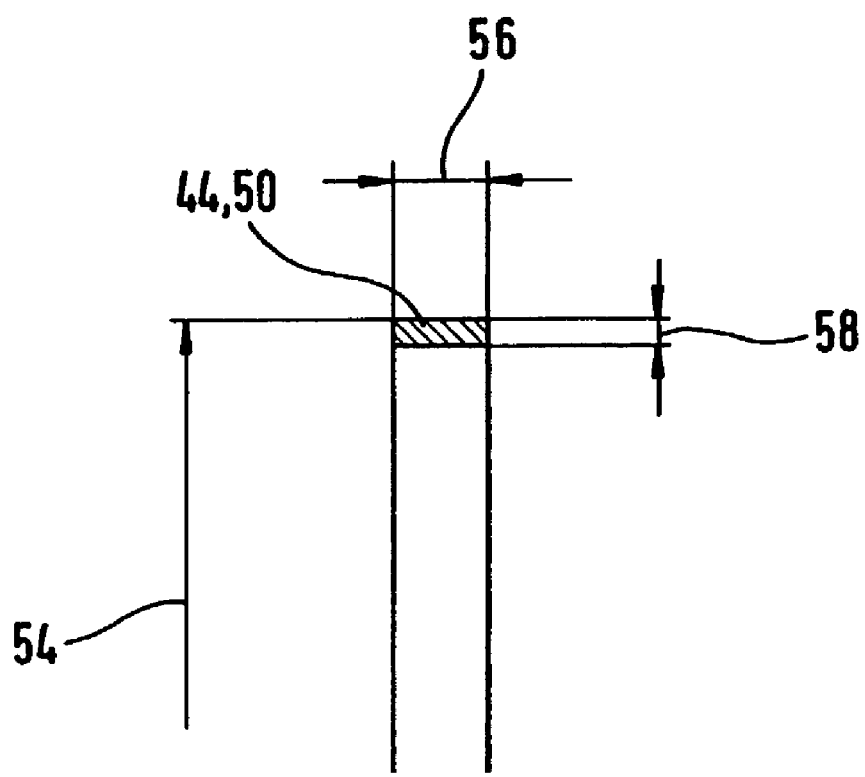
FIG. 4 is a cross-sectional view of a preset breaking ring.

FIG. 4 illustrates an example embodiment of such a preset breaking ring 44, 50. In the example embodiment, the preset breaking ring 44, 50 has a diameter 54, a width 56 and a thickness 58. The required resistance to shearing of preset breaking rings 44, 50, that is, the predetermined stress that will lead to the fracture of preset breaking rings 44, 50, may be determined with the aid of diameter 54, width 56 and thickness 58, and the material parameters.

Figure 5:
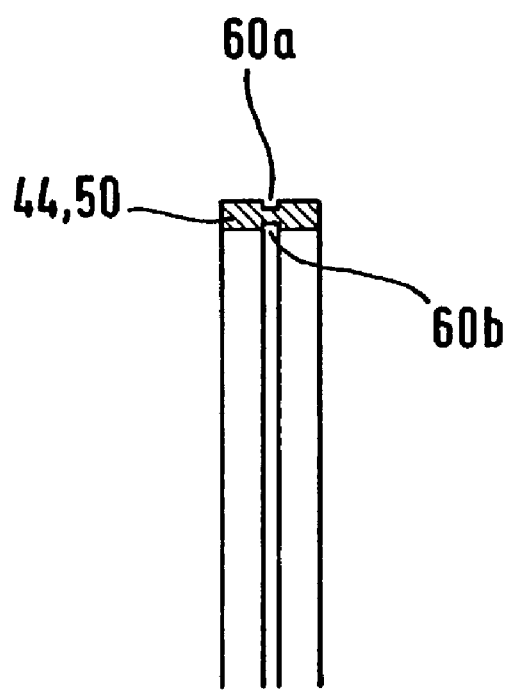
FIG. 5 is a cross-sectional view of a further example embodiment of a preset breaking ring according to the present invention.

By contrast to preset breaking ring 44, 50 illustrated in FIG. 4, preset breaking ring 44, 50 illustrated in FIG. 5 has in addition a ring groove 60a, 60b. Providing ring groove 60a, 60b may provide that the resistance to shearing of preset breaking rings 44, 50 may be determined more accurately.

What is claimed is:

1. A rotary bearing assembly, comprising:
   a non-rotatable bearing carrier housing including a first tangential plane and a second tangential plane;
   a bearing carrier rotatable about a rotational axis;
   a rotary bearing including an outer bearing ring and arranged between the non-rotatable bearing carrier housing and the bearing carrier and radially and axially fixed at the outer bearing ring via the first tangential plane and the second tangential plane; and
   an arrangement configured to form a preset breaking point at a predetermined stress, the arrangement disposed in the first tangential plane and the second tangential plane concentric with the rotational axis between the outer bearing ring and the non-rotatable bearing carrier housing;
   wherein the arrangement includes:
      a first groove arranged in the non-rotatable bearing carrier housing;
      a second groove arranged in the outer bearing ring and opposite to the first groove in an axial direction; and
      two present breaking rings arranged in the first groove and the second groove and having a ring thickness; and
   wherein each of the first groove and the second groove includes a sharp-edged border.

2. The rotary bearing assembly according to claim 1, wherein the bearing assembly is adapted for use in a rotor of a turbo engine.

3. The rotary bearing assembly according to claim 1, wherein the first tangential plane and the second tangential plane are parallel.

4. The rotary bearing assembly according to claim 1, wherein the first tangential plane and the second tangential plane are arranged perpendicular to the rotational axis.

5. The rotary bearing assembly according to claim 1, wherein the rotary bearing includes a roller bearing.

6. A rotary bearing assembly, comprising:
   a non-rotatable bearing carrier housing including a first tangential plane and a second tangential plane;
   a bearing carrier rotatable about a rotational axis;
   a rotary bearing including an outer bearing ring and arranged between the non-rotatable bearing carrier housing and the bearing carrier and radially and axially fixed at the outer bearing ring via the first tangential plane and the second tangential plane;
   an arrangement configured to form a preset breaking point at a predetermined stress, the arrangement disposed in the first tangential plane and the second tangential plane concentric with the rotational axis between the outer bearing ring and the non-rotatable bearing carrier housing, the arrangement including:
      a first groove arranged in the non-rotatable bearing carrier housing;
      a second groove arranged in the outer bearing ring and opposite to the first groove in an axial direction; and
      two preset breaking rings arranged in the first groove and the second groove and having a ring thickness;
   at least one of a control device and a regulating device; and
   a sensor for detecting a fracture of the preset breaking rings and cooperating with the at least one of the control device and the regulating device to cause an immediate interruption of fuel supply after the fracture of the preset breaking rings.

7. A rotary bearing assembly, comprising:
a non-rotatable bearing carrier housing including a first tangential plane and a second tangential plane;
a bearing carrier rotatable about a rotational axis;
a rotary bearing including an outer bearing ring and arranged between the non-rotatable bearing carrier housing and the bearing carrier and radially and axially fixed at the outer bearing ring via the first tangential plane and the second tangential plane; and
an arrangement configured to form a preset breaking point at a predetermined stress, the arrangement disposed in the first tangential plane and the second tangential plane concentric with the rotational axis between the outer bearing ring and the non-rotatable bearing carrier housing;
wherein the arrangement includes:
 a first groove arranged in the non-rotatable bearing carrier housing;
 a second groove arranged in the outer bearing ring and opposite to the first groove in an axial direction; and
 two present breaking rings arranged in the first groove and the second groove and having a ring thickness; and
wherein the preset breaking rings are formed of a brittle-fracturing material.

8. The rotary bearing assembly according to claim 7, wherein the brittle-fracturing material includes one of a hardened spring steel and an inelastic ceramic material.

9. A rotary bearing assembly, comprising:
a non-rotatable bearing carrier housing including a first tangential plane and a second tangential plane;
a bearing carrier rotatable about a rotational axis;
a rotary bearing including an outer bearing ring and arranged between the non-rotatable bearing carrier housing and the bearing carrier and radially and axially fixed at the outer bearing ring via the first tangential plane and the second tangential plane; and
an arrangement configured to form a preset breaking point at a predetermined stress, the arrangement disposed in the first tangential plane and the second tangential plane concentric with the rotational axis between the outer bearing ring and the non-rotatable bearing carrier housing;
wherein the arrangement includes:
 a first groove arranged in the non-rotatable bearing carrier housing;
 a second groove arranged in the outer bearing ring and opposite to the first groove in an axial direction; and
 two present breaking rings arranged in the first groove and the second groove and having a ring thickness; and
wherein the preset breaking rings include a ring groove.

10. A rotary bearing assembly, comprising:
a non-rotatable bearing carrier housing including a first tangential plane and a second tangential plane;
a bearing carrier rotatable about a rotational axis;
a rotary bearing including an outer bearing ring and arranged between the non-rotatable bearing carrier housing and the bearing carrier and radially and axially fixed at the outer bearing ring via the first tangential plane and the second tangential plane;
an arrangement configured to form a preset breaking point at a predetermined stress, the arrangement disposed in the first tangential plane and the second tangential plane concentric with the rotational axis between the outer bearing ring and the non-rotatable bearing carrier housing, the arrangement including:
 a first groove arranged in the non-rotatable bearing carrier housing;
 a second groove arranged in the outer bearing ring and opposite to the first groove in an axial direction; and
 two present breaking rings arranged in the first groove and the second groove and having a ring thickness;
at least one of a control device and a regulating device; and
a sensor configured to detect a fracture of the preset breaking rings and configured to cooperate with the at least one of the control device and the regulating device to cause an immediate interruption of fuel supply after the fracture of the preset breaking rings.

11. A rotary bearing assembly, comprising:
a non-rotatable bearing carrier housing including a first tangential plane and a second tangential plane;
a bearing carrier rotatable about a rotational axis;
a rotary bearing including an outer bearing ring and arranged between the non-rotatable bearing carrier housing and the bearing carrier and radially and axially fixed at the outer bearing ring via the first tangential plane and the second tangential plane; and
means for forming a preset breaking point at a predetermined stress, the forming means arranged in the first tangential plane and the second tangential plane concentric with the rotational axis between the outer bearing ring and the non-rotatable bearing carrier housing;
wherein the forming means includes:
 a first groove arranged in the non-rotatable bearing carrier housing;
 a second groove arranged in the outer bearing ring and opposite to the first groove in an axial direction; and
 two present breaking rings arranged in the first groove and the second groove and having a ring thickness.

12. The rotary bearing assembly according to claim 11, wherein the first tangential plane and the second tangential plane are arranged perpendicular to the rotational axis.

13. The rotary bearing assembly according to claim 11, wherein the bearing assembly is adapted for use in a rotor of a turbo engine.

14. The rotary bearing assembly according to claim 11, wherein the first tangential plane and the second tangential plane are parallel.

15. The rotary bearing assembly according to claim 11, wherein the rotary bearing includes a roller bearing.

16. The rotary bearing assembly according to claim 11, wherein the preset breaking rings include a ring groove.

17. The rotary bearing assembly according to claim 11, wherein each of the first groove and the second groove includes a sharp-edged border.

18. The rotary bearing assembly according to claim 11, wherein the preset breaking rings are formed of a brittle-fracturing material.

19. The rotary bearing assembly according to claim 18, wherein the brittle-fracturing material includes one of a hardened spring steel and an inelastic ceramic material.

* * * * *